Sept. 19, 1961　　　D. R. BAKER ET AL　　　3,000,619
LIQUID COLLECTION STRUCTURE FOR USE IN TREATING
THE WOOD COMPONENTS OF COOLING TOWERS
Filed July 30, 1956　　　　　　　　　　　　2 Sheets-Sheet 1
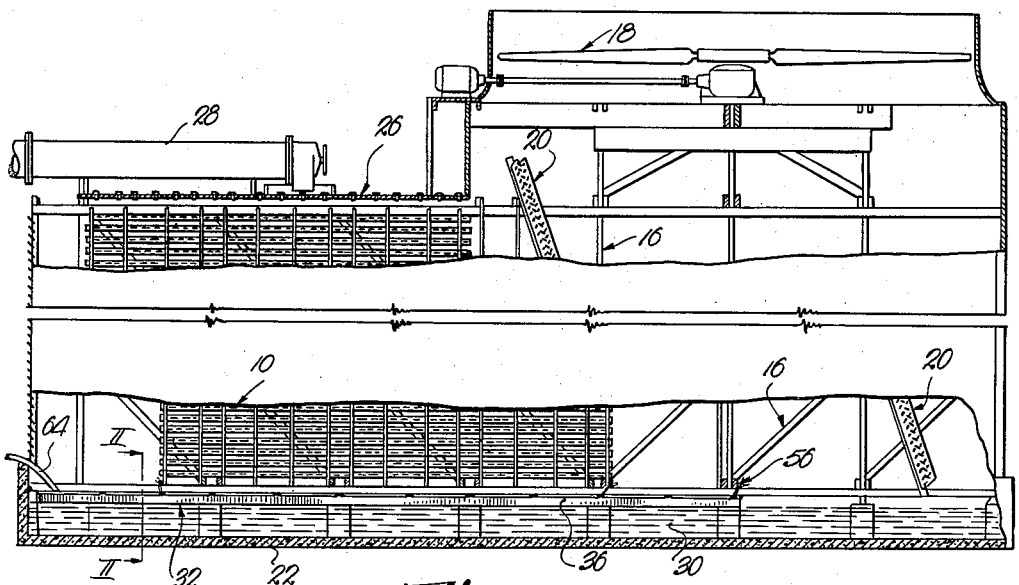
Fig. 1.
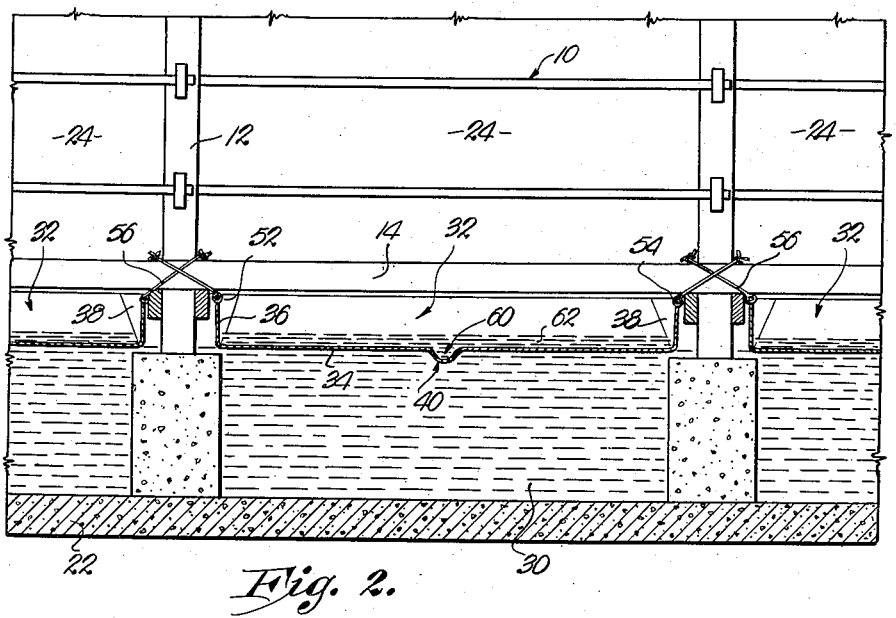
Fig. 2.
INVENTORS.
Donald R. Baker
Charles E. Loetel
BY
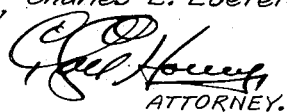
ATTORNEY.

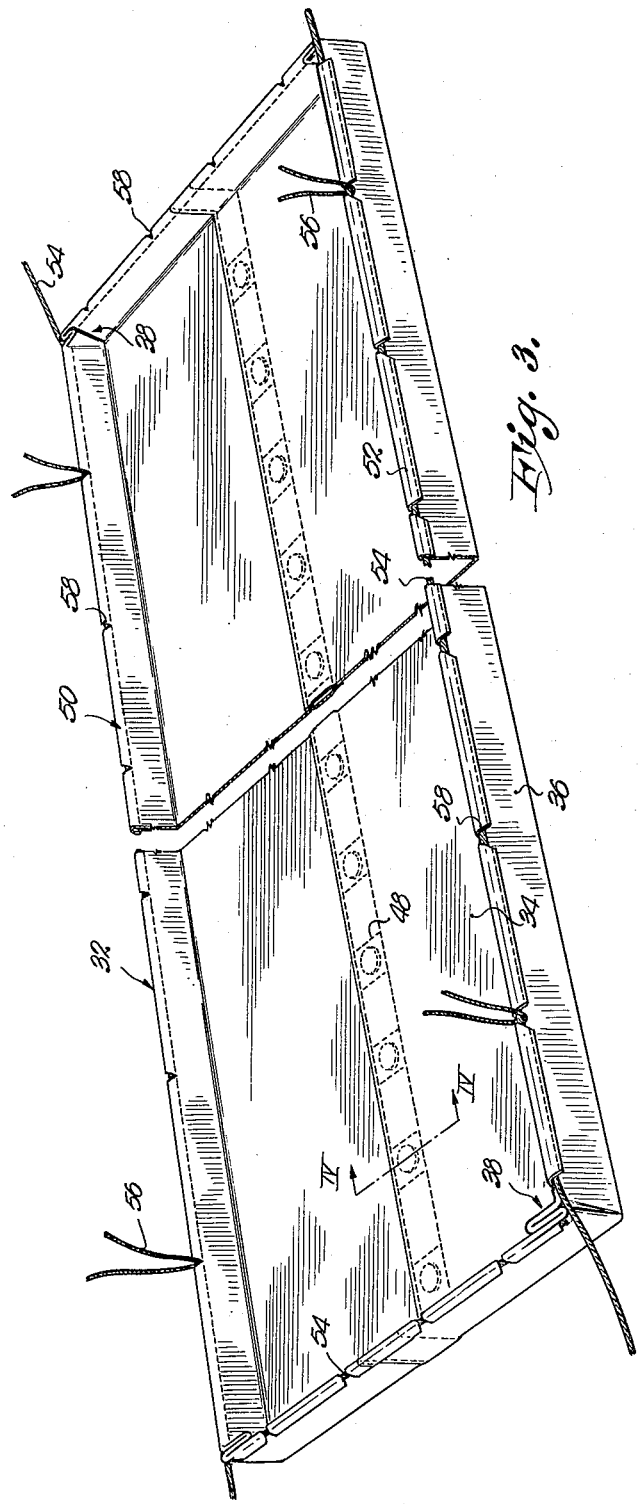

United States Patent Office 3,000,619
Patented Sept. 19, 1961

3,000,619
LIQUID COLLECTION STRUCTURE FOR USE IN TREATING THE WOOD COMPONENTS OF COOLING TOWERS
Donald R. Baker, Blue Springs, Mo., and Charles E. Loetel, Overland Park, Kans., assignors to The Marley Company, Kansas City, Mo., a corporation of Delaware
Filed July 30, 1956, Ser. No. 600,872
6 Claims. (Cl. 261—108)

This invention has to do with the preservation of wood forming the components of structures wherein the same are subjected to moisture, as for example, in water cooling towers having framework, slatted fill assemblies, distribution decks and the like made from wood and over which the water flows or to which such water is subjected.

It is the most important object of the present invention to facilitate the treatment of such wood components after erection of the tower and while the same is in place by the provision of a novel collection vessel adapted to be disposed to receive the run-off either for removal or recirculation.

While the need or desirability of treating wood used in water cooling towers has long been known, such preservation is becoming increasingly important upon realization of the fact that the deleterious effects of the water are substantially the same with respect to all woods and it is virtually impossible to find any material of that nature that will not quickly decay through continued use of the tower. Furthermore, while such preservation has been carried out in various manners prior to erection of the tower, it has been found that equally good results at tremendous savings in costs can be accomplished through treatment after erection, particularly if proper methods are utilized and time-saving equipment is employed to carry out the method.

Accordingly, it is the most important object of the present invention to provide an inexpensive, lightweight, easily employed vessel in the nature of an open top pan that may be fastened in place beneath the wood components of the tower and above the cold water collection basin thereof for receiving the excess solution which contains the preservative so that the solution is available for recirculation and ultimate removal from the system.

Another important object of the instant invention is to provide a vessel of the aforementioned character that is provided with a flexible bottom carrying weight means which sink below the level of the weights in the said basin, thereby forming a depression or trough for pooling the solution, thereby facilitating pumping or otherwise removing the same from the vessel.

A further object of the instant invention is to provide a novel method of treating water cooling towers utilizing the vessel aforementioned, which method contemplates pouring the solution over the framework, fill assembly and the like and thereupon employing the vessel to collect excess solution wherein the same is pooled, drained from the vessel and recirculated through the tower, all in absence of draining the water from the system, but instead taking advantageous use of the water as a support for the vessel.

A still further object of the present invention is to provide structure as aforementioned and a novel method, all of which eliminates a complete shutdown of the entire system by virtue of the fact that the said vessel is adapted for use in a single bay if desired so that at least part of the system may continue in operation while other wood components of the tower are being treated.

In the drawings:

FIGURE 1 is an elevational view of a conventional water cooling tower, parts being broken away and in section to illustrate the structure of the instant invention employed to carry out the novel method of treating the wood components of such tower.

FIG. 2 is an enlarged, fragmentary, cross-sectional view taken on line II—II of FIG. 1.

FIG. 3 is an enlarged, perspective view showing one of the vessels used to collect the solution draining from the wood components of the tower.

FIG. 4 is a fragmentary, detailed, enlarged, cross-sectional view taken on line IV—IV of FIG. 3; and FIG. 5 is a view similar to FIG. 4 showing the solution receiving depression formed in the bottom of the vessel when the latter is placed in use.

The water cooling tower shown in FIG. 1 is for illustrative purposes only and forms no part of the instant invention. It may be quite conventional, therefore, and U.S. Letters Patent No. Re. 21,794, issued to Leon T. Mart, on May 6, 1941, is incorporated herein by reference for a full understanding of water cooling principles, together with the nature of the wood components forming a part thereof.

For the most part the tower includes a slatted fill assembly broadly designated by the numeral 10, made from wood slats, together with a multitude of additional wood parts such as vertical columns 12, horizontal beams 14, framework 16 for supporting fan assembly 18, drift eliminator 20 and the like. All of such wood components of the water cooling tower overlie a cold water collection basin 22 which is common to a plurality of side-by-side bays 24 into which the tower is sub-divided.

During operation, hot water is directed to an open top distribution basin 26 through a conduit 28 and as the water gravitates through the fill 10 it is cooled by evaporation, the air flowing through the fill 10 in the embodiment illustrated in intersecting relationship to the gravitating liquid during operation of fan assembly 18. The cold water 30 is collected in basin 22 and pumped or otherwise conveyed to a point of use prior to recirculation through the tower.

It is seen, therefore, that the fill assembly 10 particularly is constantly subjected to the water and for that matter, virtually all of the wood components of the tower are in a moist condition throughout the time the tower is in use. Accordingly, it is essential that such wood components be treated with a preservative; otherwise, in a short period of time the results of decay necessitate costly replacement.

The method of treatment is appreciably facilitated through use of structure best shown in FIG. 3 of the drawings and consisting of an open top, pan-like liquid collecting vessel broadly designated by the numeral 32. Vessel 32 is preferably elongated and having a width and length substantially equal to that of one of the bays 24 shown in FIG. 2; however, in the event the bays 24 are unusually long in large tower structures, two or more vessels 32 may be employed in end-to-end relationship within each bay 24 respectively.

In any event, the vessel 32 includes a bottom 34 and a peripheral side wall 36. It is highly desirable that the entire vessel 32 be inexpensive to manufacture, light in weight and easily and quickly mounted within the tower as shown in FIGS. 1 and 2. Accordingly, it is to be preferred that the bottom 34 and its side wall 36 be formed from a fabric material or the like such as waterproof canvas and having the corners 38 thereof neatly folded and stitched in place in a suitable manner such, for example, as illustrated in FIG. 3.

Weight means is provided in the bottom 34 to present a depression 40 therewithin when the vessel 32 is placed in the tower. This may be accomplished in a number of ways but, by way of example, it is desirable that such weight means extend longitudinally of the vessel 32 throughout the length thereof and preferably on a medial line. The weight means shown in FIGS. 3–5 includes a plurality of spaced-apart weights 42 held in place within a longitudinal channel 44 formed in the bottom 34.

Bottom 34 may be split longitudinally and have its central marginal edges overlapped to form the channel 44 when longitudinal lines of stitching 46 are used to interconnect the two parts of the vessel 32. In order to avoid longitudinal displacement of the weights 42, cross stitching 48 may be provided as seen in FIG. 3.

Suitable, easily applied and removed fastening means is employed to mount the vessel 32 within the tower and which includes piping 50 at the uppermost periphery of the wall 36 including a tubular hem 52 and a bead 54 within the hem 52. Manifestly, the bead 54 may consist of any lightweight rope, cord or the like since the vessel 32 is supported primarily by the water 30 within basin 22. Consequently, the fastening means is needed only to hold the flexible side wall 36 of the vessel 32 in an upright condition and to maintain the vessel 32 in place between a pair of columns 12 within one of the bays 24.

Fastening of the vessel 32 to the framework of the tower such as to columns 12, beams 14 and the like, through use of the ropes 54, together with tying elements 56, may be quickly accomplished by workmen and in this respect it is to be pointed out that there is sufficient room beneath the fill 10 and above the basin 22 for such operation. The tying elements 56 are attached to the rope 54 at spaced intervals throughout the uppermost periphery of the wall 36 and to this end, notches 58 are cut into the hem 52 for clearing the tying elements 56.

It is now apparent that when the vessel 32 is tied in place in a manner illustrated by FIGS. 1 and 2 of the drawings, its primary support is provided by the water 30 upon which the bottom 34 of the vessel 32 floats. However, by virtue of the provision of weight means 42 which readily sink in the water 30 below the level thereof, forming the depression 40 in the bottom 34, there is presented a trough 60 for collecting or pooling solution 62 flowing from the wood components of the tower during the treatment process.

It is to be pointed out also, that by virtue of using weight means 42, the bottom 34 is held taut between trough 60 and the side wall 36, eliminating wrinkles and other depressions within the bottom 34 which would tend to collect and pool the liquid 62. In other words, all of the collected substance readily flows to the trough 60 for removal through use of a pump or the like having its inlet tube 64 extending into the trough 60.

In carrying out the method, the solution containing the preservative is poured or flooded over the wood components of the tower and permitted to gravitate therethrough. The excess is collected by the vessels 32, pooled within the depressions 40 thereof, and pumped from the troughs 60 for recirculation as may be desired or needed.

While the composition containing the preservative forms no part of the instant invention, it is to be pointed out that the trough 60 is advantageous when it is realized that the excess material oftentimes contains granular or other heavy particles that do not remain in a suspended condition. Most of such material will readily flow into the trough 60 but through use of water hoses, it may be flushed into the trough 60 for accessibility to the conduit 64.

While the hot water distribution basin 26 is employed for receiving the solution and distributing the same over the fill assembly 10, other wood components of the tower may be treated by pouring or spraying the solution thereon through use of hoses. In any event, the excess is all collected by the vessels 32 for removal from the water cooling system or recirculation as the case may be. Normally, all of the liquid 62 may be removed from the trough 60 by extending the conduit 64 thereinto at one end of the vessel 32, but the formation of an elongated trough 60 facilitates movement of the terminal end of the conduit 64 along the trough 60 as desired to completely drain the same prior to removal from the vessel 32 from the tower.

The advantages of using a lightweight, inexpensive, flexible vessel as distinguished from a rigid pontoon or other receptacle, are now quite apparent. Slight differences in the dimensions of the bays are of little consequence and the water 30 within the basin 22 is utilized to advantage. Shipping costs from point to point are not excessive and the entire vessel 32 may be easily and quickly folded into a relatively small, compact package for such purpose.

It is additionally manifest that through use of structure of the kind set forth, and by following the method outlined, it is unnecessary to drain the water 30 from the cooling system and, in fact, it is not even necessary to shut down the entire tower since one or more bays may be treated while the remaining parts of the tower continue in operation. Furthermore, the system does not become contaminated with the material used for preservation purposes and very little of such solution is wasted during the treating process.

Having thus described the invention what is claimed as new and desired to be secured by Letters Patent is:

1. In a water cooling tower having a cold water receiving basin and wood components overlying the basin including framework and a fill, structure for use in the treatment of said components with a solution containing a preservative, said structure comprising a pan-like, liquid-collecting vessel adapted to collect said solution as the latter is poured over the wood components and when the vessel is placed beneath said components upon the level of water in the basin, said vessel having a flexible bottom provided with weight means, presenting a depression in said bottom for pooling the liquid and holding the remainder of the bottom taut as the weight means sinks below said level of water; and means on the vessel for tying the same to said framework.

2. In a water cooling tower having a plurality of elongated, side-by-side bays each provided with wood components including framework and a fill, there being a cold water receiving basin common to the bays therebeneath, structure for use in the treatment of said components with a solution containing a preservative, said structure comprising a pan-like, liquid-collecting vessel for each bay respectively adapted to collect said solution as the latter is poured over the wood components and when the vessel is placed beneath said components upon the level of water in the basin, said vessel having a flexible bottom provided with weight means, presenting a depression in said bottom for pooling the liquid and holding the remainder of the bottom taut as the weight means sinks below said level of water; and means on the vessel for tying the same to said framework.

3. Structure as set forth in claim 1 wherein said vessel has a number of normally upright, interconnected sections defining a peripheral side wall, said weight means comprising a number of individual, spaced weights carried by said bottom and disposed in a line thereacross in sufficiently spaced relationship to a pair of opposed wall sections to permit the weights to sink in the water to present said depression.

4. Structure as set forth in claim 3 wherein is provided fastening means on said sections of the vessel for retaining the said wall in an upturned position when the bottom is placed in said water.

5. Structure as set forth in claim 4 wherein said means for tying the vessel to said framework includes a plurality of flexible tying elements secured to the upper margins of said side wall sections of the vessel.

6. Structure as set forth in claim 3 wherein is provided means on said bottom in overlying relationship to said weights for retaining the latter in predetermined relative relationship.

References Cited in the file of this patent

UNITED STATES PATENTS

| | | |
|---|---|---|
| 1,039,824 | Schumacher | Oct. 1, 1912 |
| 1,672,326 | Kobiolke | June 5, 1928 |
| 1,844,872 | Shipman | Feb. 9, 1932 |
| 2,135,974 | Graban | Nov. 8, 1938 |
| 2,206,179 | Frank | July 2, 1940 |
| 2,321,058 | Wiggins | June 8, 1943 |